United States Patent [19]
Coulter, Jr. et al.

[11] 3,763,934
[45] Oct. 9, 1973

[54] METHOD OF TEMPORARILY SEALING A PERMEABLE FORMATION
[75] Inventors: Albert W. Coulter, Jr.; Daniel L. Gibson; Kenneth H. Nimerick, all of Tulsa, Okla.
[73] Assignee: The Dow Chemical Company, Midland, Mich.
[22] Filed: Apr. 3, 1972
[21] Appl. No.: 240,791

Related U.S. Application Data
[63] Substitute for Ser. No. 113,089, Feb. 5, 1971, which is a continuation-in-part of Ser. No. 67,675, Aug. 3, 1970, abandoned, which is a continuation of Ser. No. 623,232, March 15, 1967, abandoned.

[52] U.S. Cl.................................. 166/294, 166/295
[51] Int. Cl........................................... E21b 33/138
[58] Field of Search.......................... 166/295, 294; 175/65; 252/8.55 A; 106/209

[56] References Cited
UNITED STATES PATENTS
3,163,219  12/1964  Wyant et al. ................. 252/8.55 X
3,198,268  8/1965   Lindblom et al. ..................... 175/72
3,227,212  1/1966   Black et al............................ 166/294
3,251,768  5/1966   Walker ............................... 252/8.5
3,319,715  5/1967   Parks................................... 175/65
3,421,584  1/1969   Eilers et al.......................... 166/295
3,500,929  3/1970   Eilers et al.......................... 166/295
3,615,794  10/1971  Nimerick ............................ 106/209
3,687,200  8/1972   Routson.............................. 166/295

Primary Examiner—Stephen J. Novosad
Attorney—William M. Yates

[57]        ABSTRACT

A composition is provided which may be employed for the selective sealing of permeable formations. The composition contains at least one particulate galactomannan gum which has been treated to render the gum hydrophobic in aqueous solutions having a pH of at least about 7.5; a pH control agent, and a water-soluble organic polymeric suspending agent.

2 Claims, No Drawings

METHOD OF TEMPORARILY SEALING A PERMEABLE FORMATION

CROSS-REFERENCE TO RELATED APPLICATIONS

This application is a division of application Ser. No. 113,089, filed Feb. 5, 1971, allowed, which in turn was a continuation-in-part of application Ser. No. 67,675, filed Aug. 3, 1970, now abandoned, which in turn was a continuation of application Ser. No. 623,232, filed Mar. 15, 1967, now abandoned.

BACKGROUND OF THE INVENTION

It is often desirous to temporarily seal or plug a permeable formation such as those located in a subterranean formation penetrated by an opening, e.g. borehole, so that other less permeable zones can be treated (i.e. fractured, acidized, etc.). Many methods and compositions have been employed for temporarily plugging or sealing these openings and passageways. Plugs and seals composed of various type materials are known and used. For example, fibrous, flaky or granular plugging agents, cement and viscous gels have been employed as plugging and sealing agents. These present methods and agents suffer from certain disadvantages. Fibrous materials, e.g. hay, sponges, etc., do not perform with predictable success and in many instances an impervious seal is not obtained in vuggs or fissures even when large quantities of material are pumped into the zone. Cementing requires an extended period of time both to allow the cement to set and then breaking through (drilling) the cement once circulation is again desired. Furthermore, cementing can be quite expensive and also can cause serious damage to producing formations. The more recent use of gels, such as cross-linked polysaccharides, has proved to be a great improvement over the former methods. However, difficulties found in the use of many of these gels include, instability of the gels with pH changes, nonuniformity of the gel solutions placed into the borehole, premature setting up (hydration and crosslinking) of the gels, a prolonged setting time, failure of the gel to break down within a certain predetermined period of time, high fluid loss of the unset gels, weakness of the set gel to extrusion caused by pressures and low resistance to elevated temperatures. There is therefore a need for a composition that can be emplaced as a readily pumpable slurry, thereafter sets up to form a mass capable of withstanding appreciable pressure, and subsequently liquefies so that the plug ceases to restrict the flow of fluids through the formation.

The present composition demonstrates uniformity, strength, predictable gellation setting times and breakdown times, good fluid retaining characteristics, and stability to a wide range of pH values. The composition may be prepared at the site of use employing locally available water supplies having a wide divergence in initial pH values, e.g. 3 to 10.

As employed herein a readily pumpable slurry is a slurry having rheological properties such that it can be pumped through 100 feet of 2 inch inside diameter pipe at a minimum rate of about 2 bbls/minute with about 100 psi pumping pressure.

SUMMARY OF THE INVENTION

The present invention comprises a granulated formulation; an aqueous slurry composition containing a portion of the constituents of the granulated formulation in solution, and a method of treating a permeable subterranean formation employing the slurry.

The granulated composition comprises a galactomannan gum which has been treated to render the gun hydrophobic (less hydrophillic than normal) when dispersed in an aqueous solution having a pH of at least about 7.5; a pH control agent, and a water-soluble organic polymer suspending agent.

To employ the composition, it is mixed with a sufficient amount of water (as a carrier liquid) to make a readily pumpable slurry mixture. The slightly viscous slurry is injected (such as by pumping under pressure) into the formation to be sealed where it autogenously gels, i.e. sets up, to give a temporary, fluid-tight, pressure resistant, rigid gel which subsequently (after a period of time) disintegrates and ceases to plug.

PREFERRED EMBODIMENTS OF THE INVENTION

In the practice of the present invention, the granulated composition comprises the following combination of constituents as parts by weight.

| Constituent | Range | Preferred |
|---|---|---|
| Hydrophobic galactomannan gum | 50–1500 | 300–750 |
| A readily water-soluble organic polymeric suspending agent | 3–100 | 20–60 |
| pH control agent | 0.03–600 | 0.18–300 |

To make the novel slurry composition of the present invention, the granulated product (considered in pounds for illustrative purposes) is admixed with a sufficient quantity of an aqueous solution to make an equivalent of 1,000 gallons of slurry. An equivalent of about 50 pounds to about 2,200 pounds of the composition defined by column one or from about 300 to about 1,080 pounds of the preferred composition are admixed with a sufficient quantity of an aqueous solution to make about 1,000 gallons of the indicated slurry.

Galactomannan gum as employed herein refers to those natural occurring polysaccharides derived from various endosperms of seeds. They are primarily composed of D-mannose and D-galactose units. They generally have similar physical properties, such as being soluble in water to form thick highly viscous solutions which usually can be gelled (cross-linked) by the addition of such inorganic salts as borax. Examples of galactomannan gums include Tara, Hizachi, locust bean, Paloverale, Flame tree, guar, Honey locust, Green garrafin, Kentucky coffee bean, Japanese pagoda, Prairie-mimosa, Indigo, Jenna, Rattlehox, Lucerne, Clover, Fenergruk seeds and Soy bean hulls. The gum is provided in a convenient particulate form generally smaller than what will be retained on a No. 20 mesh sieve (U.S. Standard Screen Series) but larger than that which passes through a No. 200 mesh sieve.

A hydrophobically treated galactomannan gum as employed herein is a galactomannan gum which has been treated in such a manner that the natural hydrophillic properties of the gum are inhibited sufficiently to allow the gum to be dispersed in an aqueous carrier liquid having a pH of about 7.5 or greater and the dispersion to be emplaced in a permeable zone before any substantial hydration (swelling or opening) of the gum occurs. The gum, however, swells in acidic solutions. The treating agent is herein referred to as a hydrophobing agent. To render the gum hydrophobic it may actually be pretreated to undergo some physical or chemical change prior to being placed in an aqueous carrier liquid (e.g., by being treated with a suitable hydrophobing agent) or it may be associated with (coated, admixed with, etc.) a hydrophobing agent which affects the normal hydrophillic characteristic of the gum after being placed into the carrier liquid.

The hydrophobing agent may be any material capable of temporarily inhibiting the natural hydrophillic property of the gum. An example of a hydrophobing agent which affects the hydrophillic characteristic of the gum after being placed in the water is a material capable of liberating borate ions when added to water, e.g. alkali metal borates, sodium tetraborate (borax), sodium perborate, and sodium metaborate are preferred agents for use in the practice of the present invention. Details of one method for pretreating the gums with such a hydrophobing agent is taught in U.S. Pat. No. 2,868,664. Generally, a sufficient amount of the boron containing agent is employed to bring the pH of an aqueous dispersion of the gum up to at least about 7.5. From about 0.5 to 1.0 per cent by weight of such agent, based on the weight of the gum, is usually sufficient. Preferred gums are guar, tara or locust bean treated with borate ion liberating material.

Further information is available on the subject of borate-treated galactomannan gums in Chemical Abstracts vol. 43, part 3, column 6936c of Sept.–Nov., 1949 and in Industrial Gums by Whistler and BeMiller; published by the Academic Press, New York (1959), page 339.

As indicated the hydrophobically treated galatomannan gum hydrates very slowly in aqueous solutions having a neutral or alkaline pH but hydrates very quickly in acidic aqueous solutions.

The exact amount of gum employed for gel stability will depend to some extent on the temperature to which the set gel will be subjected in the formation to be sealed. At higher temperature levels, e.g. greater than about 125°F, a greater amount of the gum should be present. For example, above 125°F a gel composition containing guar gum, polyacrylamide and sodium dichromate at a total concentration of about 500 lbs/960 gallons of water has been found to be satisfactory whereas a concentration of only about 300 lbs/980 gallons of water was found practical for use at temperatures ranging from about 60° to 125°F.

The suspending agent comprises a water-soluble organic polymer which is readily dispersible in aqueous solutions having a neutral to alkaline pH, i.e. the initial pH of an aqueous dispersion of the slurry composition of the present invention, to form visually continuous solutions or dispersions.

The terminology "water-soluble, organic polymer," as used herein refers to nonionic, anionic, cationic or ampholytic organic materials composed of a number of repeating units or mers. The useful polymers are characterized by dispersibility in water to form visually continuous solutions or dispersions. This includes truly water-soluble polymers which disperse in water to provide homogeneous, transparent solutions subject to water dilution without phase separation. Also included within the meaning of water-soluble, as used herein, are the water-swellable polymers which readily disperse in water to provide a highly disperse and visually continuous system of individually distinct, gel particles.

The water-soluble, organic polymers useful herein are available in a wide variety of chemical composition. They may be obtained as natural polymeric products, by modification of natural polymers or by synthesis from polymerizable materials.

Water solubility is imparted to such polymers by the presence in and along the polymer chain of a number of hydrophilic moieties sufficient to more than offset the otherwise hydrophobic character of the organic polymer. One class of such hydrophilic moieties includes the ionizable groups. Among these are the sulfate and sulfonate groups, carboxylate salt groups, amino and ammonium groups, the latter being inclusive of protonated as well as quarternary derivatives of the amines, e.g., mono-, di- and trialkyl substituted ammonium salt groups, and phosphoric acid groups and mono- and dibasic salts thereof. Whenever acid salts are referred to, those generally intended are the alkali metal, alkaline earth metal (water-soluble species thereof) and ammonium salts.

Another class of water-solubility imparting, hydrophilic moieties are such nonionizable groups as carboxamide and mono- and dialkyl N-substituted carboxamides, having a total of up to about 8 carbons. Also of a hydrophilic nature, though less strongly than some of the aforementioned groups are hydroxyl, acetal, ketal, carbamate and lactam groups. In any event, the polymers employed herein contain one or more of the aforedescribed hydrophilic moieties, and the like, in and along the polymer chain in a sufficient amount to render the resulting polymer water-soluble as defined above.

The polymers used in the invention are characterized by a high molecular weight. An adequate molecular weight is shown if the polymer can be obtained as a particulate solid and a 2 per cent by weight solution of the polymer in water, at a pH of 7, has a viscosity measured with a Brookfield viscosimeter at 25°C of at least 10 centipoises.

Technology for preparing the water-soluble polymers useful herein is known. Useful ethylenically polymerized polymers are described in Hedrick et al., U.S. Pat. No. 2,625,529, Aimone et al., U.S. Pat. No. 2,740,522 and Booth et al., U.S. Pat. No. 2,729,557. A variety of water-soluble polysaccharide derivatives are described in Gloor, U.S. Pat. No. 2,728,725. Water-soluble polyurethanes or chain extended polyols are taught in Honea et al, U.S. Pat. No. 3,054,778 and a variety of polycarbonates and polylactams in Hibbard et al., U.S. Pat. No. 3,044,982, Walles et al., U.S. Pat. No. 2,946,772, Vitales, U.S. Pat. No. 2,874,124 and Fong et al., U.S. Pat. No. 3,000,830. These are to mention but a few of the well-known chemical avenues for the preparation of water-soluble, macromolecules. Further general descriptions of a variety of water-soluble, particulate macromolecules is contained in Davidson and Sittig, "Water-Soluble Resins," Reinhold Publishing Corp., New York, 1962.

Preferred for use herein are water-soluble carbamoyl polymers. The most common forms of these are ethylenically polymerized polymers having attached along their polyalkane backbone a plurality of carbamoyl groups according to the formula:

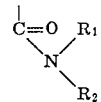

wherein $R_1$ and $R_2$ are independently selected from the group of hydrogen and alkyl hydrocarbons with one to four carbons.

In particular, useful carbamoyl polymers include the various water-soluble homopolymers and copolymers of acrylamide and methacrylamide. Other carbamoyl polymers are the various water-soluble copolymers of N-substituted acrylamides such as N-methyl acrylamide, N-propyl acrylamide and N-butyl acrylamide. Still other carbamoyl polymers are prepared from the amides and half amides of maleic and fumaric acids. In general, any ethylenically unsaturated and polymerizable monomer, which contains the carbamoyl group, may be employed in the preparation of the preferred carbamoyl polymers.

Best results are obtained, if at least about 25 mole per cent of the polymerized mers have carbamoyl substituents. The balance of the comonomers used to prepare the copolymers can be provided in the form of any water-soluble, or water-insoluble, monoethylenically monomer copolymerizable therewith, so long as the total amount of water-soluble monomers used is sufficient to impart water-solubility to the finished polymer.

Other water-soluble polymers useful herein are the lightly cross-linked water-swellable polymers. Such cross-linking can be achieved by irradiation of linear, water-soluble polymers under conditions which promote cross-linking or by incorporating a small amount, e.g., up to 1 percent by weight, of a polyfunctional monomer into the polymerization recipe for a linear water-soluble polymer. Examples of such monomers, which may be copolymerized with monoethylenically unsaturated monomers, are methylenebisacrylamide; divinylbenzene, divinylether, divinylether of ethylene glycol and the like.

It is usually preferred that the suspending agent forms a near neutral or basic pH value when dispersed in an aqueous solution, i.e. one which will not cause an acidic pH and thus cause a premature swelling of the hydrophobically treated gum.

As indicated, one type of polymer found to be especially effective for this purpose is acrylamide polymers, including specifically polyacrylamide in varying degrees of hydrolysis and acrylamide copolymerized with one or more ethylenically unsaturated monomers such as acrylic acid, methacrylic acid, vinylsulfonic acid, vinylbenzylsulfonic acid, vinylbenzenesulfonic acid, and alkali and alkaline earth metal salts of such acids as described in U.S. Pat. No. 2,831,841, column 3, lines 34 to 45 and in U.S. Pat. No. 2,909,508, examples 1 to 5.

Preferably the acrylamide polymer and acrylamide copolymers are those having a molecular weight such that when dispersed in a neutral or alkaline solution in an amount ranging from about 0.05 to about 1 percent by weight give a viscosity ranging from about 5 to about 200 centipoises at ambient temperatures. Preferably the viscosity is achieved within about 10 minutes.

A particularly good suspending agent to employ is a polymer of from about 40 to 60 vinylpyrrolidone and 60 to 40 acrylamide (molar proportions) copolymerized by mixing between about 0.5 and 1.0 per cent, by weight, of the monomeric mixture of a cross-linking agent, e.g. methylenebisacrylamide, in the presence of between about 0.1 and 0.5 per cent of a catalyst, e.g., azobisisobutyro-nitrile, in about a 10 to 40 percent aqueous dispersion.

Other water-soluble organic polymeric materials found effective are synthetic derivatives of cellulose and natural occurring water-soluble gums which are not affected by the presence of the hydrophobing agent and which produce a neutral to alkaline pH when dispersed in an aqueous solution, and modified starches having similar characteristics. Examples of natural gums which give a near neutral pH are the tree exudates including gum arabic, gum tragacanth, kutera gum, ghati, mesquite gum and the like. Cellulose derivatives which may be employed include, for example, methylcellulose, hydroxy propyl methylcellulose, cellulose ethers and esters, e.g., as set out in Encyclopedia of Chemical Technology, 2nd Ed., vol. 4, page 618, John Wiley and Sons, New York, and other similar suspending agents. The exact agent employed is not critical to the practice of the invention except to the extent that it functions as defined hereinbefore.

Preferably the suspending agent is employed in an amount ranging from 0.05 to 10 per cent by weight of the galactomannan employed. The exact amount of suspending agent will depend on the amount of hydrophobically treated gum employed, the temperature at which the slurry is to be employed, the other constituents present in the slurry and the capacity of the injection equipment (e.g. pumps, blenders, etc.). The suspending agent allows for the formation of a slightly viscous slurry containing an even dispersion of the galactomannan gums therein and prevents fluid loss of the initial slurries so that the gum can be emplaced into position in the permeable zone to be treated.

A pH control agent should be employed to maintain the pH of the initial slurry at least at about 7.5, preferably between about 8 and 12. This assures that the hydrophobically treated gum will not prematurely swell because of acidic conditions. A hydroxyl ion source and/or preferably a buffering agent may be employed.

The hydroxyl ion source may be any soluble or partially soluble hydroxide or carbonate that provides the desirable pH value in the slurry. $Ca(OH)_2$ or $Mg(OH)_2$ are preferred. Other acceptable materials are $Bi(OH)_3$, $Co(OH)_2$, $Pb(OH)_2$, $Ni(OH)_2$, $Ba(OH)_2$, $Sr(OH)_2$ and the alkali metal hydroxides and carbonates. The amount of the hydroxyl ion source to provide is that which is sufficient to yield a pH value in water of at least 7.5 and preferably between 8.0 and 12.

A buffering agent is preferably employed in the practice of the present invention to provide a buffered solution, i.e. a solution to which moderate amounts of either a strong base or acid may be added without causing any large change in pH value of the solution. A buffer solution usually contains a weak acid and a salt of the weak acid, an acid salt with a normal salt or a mixture of two acid salts. Examples of suitable buffering agents which may be employed to provide a buffered solution having the desired pH value are $NaH_2PO_4$, $Na_2HPO_4$; boric acid-sodium hydroxide; acetic acid-sodium hydroxide; boric acid-borax; sodium carbonate-sodium bicarbonate; and sodium bicarbonate, or other like agents. By employing a buffering agent instead of merely a hydroxyl ion producing material a composition is provided which is more adapted to a wide variance of pH values found in local water supplies and the influence of acidic materials located in formations and the like. The pH control agent may be varied between about 0.6 percent and about 40 percent by weight of the treated gum employed.

The invention is not dependent upon a theory as to its operation. It is not presently known how the various components of the fluid composition function during the gelation stage. One theory is that the borate treated gum is crosslinked in aqueous solutions having a high pH thus minimizing its solubility and retarding its hydrolysis at a basic pH. At temperatures below 175°F the strength of this crosslinking mechanism is sufficiently strong to prevent hydrolysis. Above 175°F, sufficient energy is present to allow hydrolysis and subsequent increases in viscosity of the aqueous system. It is known that galactomannans as a class are degraded by both acidic conditions and by heating to temperatures above 150°F. Most rapid degradation occurs when both high temperatures and an acidic pH (less than 7.0) are present. It has been found that as a galactomannan water system is heated to an elevated temperature, i.e. above about 150°F, the pH of the solution decreases, becoming more acidic. It has been postulated that such decrease in pH is the result of degradation of the galactomannan to produce various organic acids. It is, therefore, one purpose of this invention to recognize the foregoing hypothesis as applicable and to use various metal hydroxides as a means of neutralizing these organic acids as they are formed or by using a buffering agent to provide buffered solution. By neutralizing said organic acids, or by providing a buffered solution the rate of degradation is retarded and the efficiency of the gum system is extended. Frequently, fluid loss control agents are advantageously employed in the invention. The preferred material is silica flour (particles having an average size of less than about 1 micron and more desirably less than 0.1 micron). However, any substantially inert organic or inorganic pulverulent material (including starches and the like) may be employed as the fluid-loss control additive.

All the particulate constituents of the invention can be premixed and packaged in a convenient form. When ready for use, the particulate product is simply admixed with the necessary quantity of an aqueous solution to form an aqueous slurry of the treated gum. The slurry is then pumped into the formation to be sealed whereupon it sets up to form a firm plug. The set plug will breakdown after a predetermined period of time, thus allowing circulation through the treated area.

Since the ingredients are readily dispersible, the composition of the invention is easily prepared. It exhibits excellent low fluid-loss, thickens at a controllable rate which may be a relatively short time, if desirable, e.g. between one-half hour and 1 hour, or over a period of several hours if preferred, and thereafter liquefies within a few hours or longer, as desired.

In the following Examples tests were conducted to show the desirable properties of the gelled composition of the invention. Thickening or gel time and plug life were determined for each series and are set out in the tables appearing hereinafter.

Thickening time, which herein is also considered the gel time, was determined according to Section 10, page 20 et seq., of API RP 10B (March, 1965), employing the schedule designated herein for each series of tests. The gel time is also referred to herein sometimes as working time because it is the permissible time between admixture of the ingredients and the gelation during which the composition remains fluid.

The time between gelation and breakdown or liquefaction of the gelled plug is called herein plug life. It was determined as follows:

A vertically held ¾-inch diameter 6-inch long steel pipe nipple, capped at the lower end, and containing a ⅜-inch diameter steel ball, was nearly filled (allowing a little room for expansion) with a quantity of the slurry gelable composition. A cap was placed on the top of the nipple and it, with its contents put vertically in a bath, which had been preheated to a specified temperature. Thereafter, at 15-minute intervals, the nipple was inverted, the ball falling freely through the ungelled fluid. The inverting process was continued through the gelation stage, at which time the ball became firmly in an immobile state by the gelled composition, and thereafter the periodic inversion further continued until the gel broke and again allowed the ball to fall freely. The sound of the ball striking the cap at the bottom of the nipple when inverted indicated that the gel had liquefied, and this was recorded as the plug life. The reliability of this test was also confirmed by opening the system and observing the state of the admixture.

The tests were conducted by admixing the particulated borated gum with the proper amount of water and thereafter adding a pH control agent, e.g. a soluble carbonate or hydroxide, when used, followed by a suspending agent, e.g. an acrylamide polymer to the aqueous dispersion of gum.

EXAMPLE 1

500 Pounds of particulated hydrophobically-treated guar gum (prepared according to U.S. Pat. No. 2,868,664) were admixed with 50 pounds of linear polyacrylamide, about 30 percent hydrolyzed, (purchased under the trademark Separan NP30) and enough water to make 1,000 gallons at the ambient temperature of about 70°F. One portion of the slurry composition so made was tested at 250°F for working time (time elapsed between mixing and state of gel taken as 100 poises) recorded in minutes according to the procedure of Schedule 19 of Section 10 of API RP 10B. A second portion was tested for plug life as above described.

A series of tests (Nos. 2–6 Table I) were conducted at a temperature of 250°F and an increasing amount of soda ash (commercial grade $Na_2CO_3$) was admixed with the borated guar gum prior to admixture of the polyacrylamide.

A second series of tests (Nos. 7 & 8 Table I) were conducted at a temperature of 250°F employing $Ca(OH)_2$ instead of soda ash.

Test No. 9 Table I was conducted as in the second series except that the temperature of the test was 265°F and the plug life was determined according to Schedule 20 of Section 10 of RPI RP 10B.

In the next series of tests (Nos. 10–19), the tests were conducted according to the procedure followed in Test No. 9 except that the temperature of the test was 300°F and either soda ash or $Ca(OH)_2$ was admixed with the borated guar gum before admixing the polyacrylamide therewith.

In the final series of tests (Nos. 20 & 21) tests were conducted according to the procedure in the previous series except the temperature employed was 325°F and the Schedule of Section 10 of API RP 10B followed was Schedule 21.

The results of these tests are shown in Table I.

TABLE I

500 Pounds of Borated Guar Gum and 50 Pounds of Acrylamide Polymer per 1,000 Gallons of Dispersion

| Test number | Additive in pounds per 1,000 gallons of composition | pH value when made up | Temperature of test in °F. | Working time in minutes to reach 100 poises | Section 10 API RP 10B schedule followed | Plug life |
|---|---|---|---|---|---|---|
| 1 | None | | 8.6 | 250 | 48 | 19 | 4.5 days. |
| 2 | 5 Na$_2$CO$_3$ | | 250 | 60 | 19 | 4.5 days. |
| 3 | 10 Na$_2$CO$_3$ | 9.3 | 250 | 125 | 19 | 6.5 days. |
| 4 | 30 Na$_2$CO$_3$ | 9.8 | 250 | 290 | 19 | 7.0 days. |
| 5 | 50 Na$_2$CO$_3$ | 10.1 | 250 | | 19 | 8.0 days. |
| 6 | 80 Na$_2$CO$_3$ | 10.15 | 250 | | 19 | 8.0 days. |
| 7 | 5 Ca(OH)$_2$ | 10.0 | 250 | 100 | 19 | 5.5 days. |
| 8 | 20 Ca(OH)$_2$ | | 250 | 300 | 19 | 8.0 days. |
| 9 | 50 Ca(OH)$_2$ | 11.7 | 265 | 185 | 20 | 8.5 days. |
| 10 | 10 Na$_2$CO$_3$ | 9.3 | 300 | 40 | 21 | 23.5 hours. |
| 11 | 40 Na$_2$CO$_3$ | | 300 | 80 | 21 | 28.5 hours. |
| 12 | 50 Na$_2$CO$_3$ | 10.1 | 300 | 130 | 21 | 20.0 hours. |
| 13 | 100 Na$_2$CO$_3$ | 10.4 | 300 | 160 | 21 | 24.0 hours. |
| 14 | 250 Na$_2$CO$_3$ | 10.5 | 300 | 190 | 21 | 20.0 hours. |
| 15 | 400 Na$_2$CO$_3$ | 10.5 | 300 | 150 | 21 | 64.0 hours. |
| 16 | 40 Ca(OH)$_2$ | | 300 | 85 | 21 | 32 hours. |
| 17 | 75 Ca(OH)$_2$ | 11.8 | 300 | 120 | 21 | 74 hours. |
| 18 | 100 Ca(OH)$_2$ | 11.9 | 300 | 115 | 21 | 78 hours. |
| 19 | 160 Ca(OH)$_2$ | 12.0 | 300 | 105 | 21 | 85 hours. |
| 20 | 160 Ca(OH)$_2$ | 12.0 | 325 | 80 | 21 | 9 hours. |
| 21 | 250 Ca(OH)$_2$ | 12.4 | 300 | 75 | 21 | 10 hours. |

EXAMPLE 2

In this example, tests were conducted similarly to those in Example 1 except that 750 pounds of a borated galactomannan gum (as exemplified by borated guar gum) were used and the temperature of each test was increased by 25 Fahrenheit degrees as shown in Table II. The resulted working time and plug life tests are also shown in Table II.

TABLE II 750 pounds of borated guar gum and 50 pounds of polyacrylamide per 1,000 gallons of dispersion

| Test No. | Additive in pounds per 1,000 gallons of composition | Temperature of Test in °F. | Working time in minutes to reach 100 poises | Section 10 API RP 10B schedule followed | Plug life in days |
|---|---|---|---|---|---|
| 22 | 160 Ca(OH)$_2$ | 275 | 95 | 20 | 14.5 |
| 23 | 160 Ca(OH)$_2$ | 300 | 63 | 21 | 5 |
| 24 | 160 Ca(OH)$_2$ | 325 | 57 | 21 | 1¾ |

Reference to Tables I and II shows that a high temperature plug can be made at temperatures from 175°F to 325°F, employing a borated galactomannan gum and a polyacrylamide polymer. It can be seen that the higher the temperature, the faster the composition gels. However, it is shown that the rate of gel can be retarded by the use of such alkaline materials as sodium carbonate and Ca(OH)$_2$. The Tables also show that as little as 25 pounds of an acrylamide polymer both suspends the borated galactomannan gum and also imparts a moderate increase in pH value to provide an adequate working time within a temperature range of between about 175°F and about 200°F. At above about 225°, the acrylamide polymer concentration is best increased to at least about 50 pounds per 1,000 gallons of composition. It is preferable that the amount be increased to about 75, per 1,000 gallons of gelable composition, at temperatures approaching 300°F and above.

The degeneration or dissolution of the plug after emplacement occurs over a predetermined period of time. The higher the ambient temperature of the emplaced plug, the more rapid the degeneration of the plug. For example, a composition comprising 500 pounds of the borated guar gum and 50 pounds of the polyacrylamide polymer, the following conditions obtain: at 175°F, it remains solid up to about 28 days; at about 225°F for about 16 days; at about 250°F for about 5 days. This length of time for dissolution or disintegration (gel-breaking) of the plug is usually longer than is desirable. Therefore, less alkaline material, e.g. Ca(OH)$_2$ or Na$_2$CO$_3$, is admixed therewith to delay the gel-breaking period.

It is shown in the tables also that, at temperatures above about 250°F, the working time of the aqueous suspension of the borated galactomannan gum containing the acrylamide polymer in the absence of the alkaline material to raise the pH value, is too short for common use. It is shown, however, that the addition of Ca(OH)$_2$ or Na$_2$CO$_3$ lengthens the working time. Accordingly, the addition of such alkaline materials provide the attainment of both objectives: an increased working time and lengthened plug life, as desired.

It is also shown that plug life, above a temperature of about 275°F, may be increased by increasing the borated galactomannan gum employed, say on the order of about 750 pounds thereof per 1,000 gallons of aqueous composition being prepared.

EXAMPLE 3

In this example tests were conducted to show the effect of increasing the concentration of borated galactomannan gum in water and of admixing therewith varying amounts of Ca(OH)$_2$. The procedure followed was to slurry the borated gum, herein borated guar gum, in the amount given in Table III below, with the amount of water necessary to give the desired concentration, admix therewith the Ca(OH)$_2$ when employed, and thereafter admix 25 pounds of a suspending agent comprising polyacrylamide (about 30 percent hydrolyzed) and having an average molecular weight of between 2 and 3 million, known commercially as under the trademark Separan AP 30. The slurry so made was then placed in tubes and immersed in an oil bath, which had been preheated to 225°F. The composition was observed to gel and then further observed so as to determine the time which elapsed before the gel broke. It was considered broken, when the viscosity dropped to under 10 poises.

The results are shown in Table III.

TABLE III

| Test Number | Pounds of Borated Guar Gum per 1,000 gallons of Composition | Pounds of Ca(OH)$_2$ added per 1,000 gallons of composition | Plug Life in Days |
|---|---|---|---|
| 25 | 50 | None | 3 |

| | | | | | | |
|---|---|---|---|---|---|---|
| 26 | 50 | 1.0 | 7 | 45 | Cd(OH)₂ | 9.05 | 54 |
| 27 | 50 | 5.0 | 10 | 46 | Pb(OH)₂ | 9.1 | 72 |
| 28 | 50 | 10.0 | 15 | 47 | Ni(OH)₂ | 9.0 | 54 |
| 29 | 100 | None | 5 | 48 | Ba(OH)₂ | 11.9 | 56 |
| 30 | 100 | 1.0 | 7 | 49 | Sr(OH)₂ | 9.05 | 54 |
| 31 | 100 | 5.0 | 11 |
| 32 | 100 | 10.0 | 17 |
| 33 | 200 | None | 10 |
| 34 | 200 | 1.0 | 18 |
| 35 | 200 | 5.0 | 24 |
| 36 | 200 | 10.0 | 30 |
| 37 | 300 | None | 14 |
| 38 | 300 | 1.0 | 23 |
| 39 | 300 | 5.0 | 30 |

Reference to Table IV shows that various metal hydroxides extend the life of the plug composition of the invention when admixed with the borated gum and the thickening agent is thereafter admixed therewith.

Reference to Table III shows that the plug life is lengthened as the amount of borated gum is increased. It also shows that the plug life is increased by raising the pH value of the slurry by admixing therewith an hydroxyl ion source, e.g., a soluble hydroxide.

EXAMPLE 4

A further series of tests was conducted to illustrate some alkaline materials that may be used in the practice of the invention to delay the gelation rate and retard the rate of degradation or degeneration of the plug back to a fluid. The procedure followed was to admix the metal hydroxide with water in the proportion of 75 pounds of hydroxide per 1,000 gallons of composition; admixing borated guar gum with the aqueous hydroxide solution in a proportion of 500 pounds of the gum per 1,000 gallons of composition; and then admixing an acrylamide polymer (same as employed in Example 3) in an amount of 50 pounds per 1,000 gallons of composition. The mixture was then transferred to ¾-inch diameter, 6-inch long steel nipples each containing a ⅜-inch ball. Thereafter the nipples, as in the plug life tests above, were capped on both ends and placed in an oil bath, previously heated to 275°F. The nipples were thereafter periodically inverted as above described when the composition was gelled, the ball became immobile. When the gel later broke, (the break point being considered occurring at a viscosity less than 50 poises) the ball fell with a clearly audible impact to the bottom of the nipple when inverted.

Table IV sets out the results.

EXAMPLE 5

This series of tests was run to show the use of a cellulose derivative viz, hydroxyl ethyl cellulose, as a thickening agent in the composition of the invention. The procedure followed consisted essentially of admixing the amount of hydroxyl ion source, viz. $Na_2CO_3$ or $Ca(OH)_2$, with water and therefor admixing the amount of hydroxy ethyl cellulose (abbreviated HEC) set out in Table V below. The pH of the freshly prepared composition, the time in minutes for the composition to reach 100-poise viscosity (taken as the gel point) and the plug life are set out in Table V.

TABLE V

| Test number | Temperature[1] in °F. | Pounds of borated guar gum per 1,000 gallons of composition | Pounds of HEC/1,000 gallons of composition | Pounds of retarder per 1,000 gallons of composition | pH value[2] when made | Working time in minutes to reach 100 poise | Plug life |
|---|---|---|---|---|---|---|---|
| 50 | 200 | 300 | 50 | None | 7.5-8 | 30 | 10 days. |
| 51 | 250 | 300 | 50 | 11 Na₂CO₃ | | 62 | 3 days. |
| 52 | 250 | 300 | 50 | 16 Na₂CO₃ | | | 3-4 days. |
| 53 | 250 | 300 | 50 | 20 Na₂CO₃ | | | 4 days. |
| 54 | 250 | 500 | 50 | 15 Na₂CO₃ | | | 4 days. |
| 55 | 275 | 300 | 50 | 15 Na₂CO₃ | 10 | 66 | 36 hours. |
| 56 | 275 | 500 | 5 | 22.5 Na₂CO₃ | 10.5 | 67 | 40 hours. |
| 57 | 275 | 500 | 50 | 27.5 Na₂CO₃ | 10.5 | 80 | 44 hours. |
| 58 | 275 | 500 | 50 | 32.5 Na₂CO₃ | 10.5 | 100 | 45 hours. |
| 59 | 275 | 500 | 50 | 50 Ca(OH)₂ | 11.5 | 170 | 5 days. |
| 60 | 300 | 500 | None | 30 Ca(OH)₂ | | 87 | 18 hours. |
| 61 | 300 | 500 | None | 40 Ca(OH)₂ | | 105 | 20 hours. |
| 62 | 300 | 500 | 50 | 45 Ca(OH)₂ | 11.5 | 107 | 26 hours. |

[1] Squeeze Schedule No. 19 API RP 10B applicable at 250° F. Squeeze Schedule No. 20 API RP 10B applicable at 275° F. Squeeze Schedule No. 21 API RP 10B applicable at 300° F.
[2] pH values were determined by Hydrion pH paper.

Reference to Table V shows that a cellulose derivative, e.g. hydroxy ethyl cellulose, is satisfactory as the suspending agent in the composition of the invention and further that the hydroxyl ion sources, as represented by $Na_2CO_3$ and $Ca(OH)_2$ perform substantially as efficiently in the presence of hydroxy ethyl cellulose as in presence of polyacrylamide.

EXAMPLE 6

This series of tests was conducted to show the low fluid loss to a porous earthen formation from the composition of the invention, prior to gel, by admixture therewith of a copolymer of 60 percent N-vinyl-2-pyrrolidone and 40 percent acrylamide, crosslinked with 0.7 percent N,N-methylenebisacrylamide, identified in Table VI as polymer "J."

The tests were performed according to the standard Baroid Cell test employing 1-inch diameter, 1-inch long Berea sandstone cores (first saturated with 3 percent by weight aqueous $CaCl_2$) employing a pressure of 1000 psi and the temperature designated in Table VI. The amount of borated guar gum employed in each test was that sufficient to provide 500 pounds per 1,000 gallons of composition. The amount of polyacrylamide suspending agent and hydroxyl ion source are shown in Table VI. The fluid loss in minutes and the total volume of liquid composition through the core are also set out in Table VI.

TABLE IV

| Test Number | Metal Hydroxide Employed | pH Value as Made | Plug Life in Hours |
|---|---|---|---|
| 40 | None | 8.6 | 48 |
| 41 | Ca(OH)₂ | 12.0 | 120 |
| 42 | Mg(OH)₂ | 9.1 | 60 |
| 43 | Na(OH) | 12.0 | 86 |
| 44 | Bi(OH)₃ | 9.05 | 54 |

TABLE VI

| Test Number | Ingredients per 1,000 gallons of aqueous composition | | | Permeability to air in md. | Temperature, °F. | Fluid loss in ml. after— | | | | | | Total volume in ml. through cell corrected for 23.5 cm.² area |
|---|---|---|---|---|---|---|---|---|---|---|---|---|
| | Polyacrylamide | "J"[1] fluid loss control polymer | Added hydroxyl ion source | | | 1 min. | 4 min. | 9 min. | 16 min. | 25 min. | 180 min. | |
| 63 | 25 | None | None | 578 | 175 | 15.5 | 28.5 | 38.0 | Out of fluid | | | |
| 64 | 25 | 16 | do | 667 | 175 | 10.0 | 19.5 | 27.0 | 31 | 35 | 36 | 158.4 |
| 65 | 25 | None | do | 675 | 200 | 10 | 18 | 22 | 24 | 24.5 | 25 | 110 |
| 66 | 25 | 16 | do | 680 | 200 | 5 | 10 | 12.5 | 13 | 13.5 | 15 | 66.0 |
| 67 | 50 | None | do | 590 | 225 | 8 | 18 | 19.0 | 19 | 19 | 19 | 83.6 |
| 68 | 50 | 16 | do | 642 | 225 | 5 | 7 | 7 | 7 | 7.5 | 8.0 | 35.2 |
| 69 | 50 | None | 5 lbs. of Na₂CO₃ | 635 | 250 | 10 | 15 | 20 | 22 | 24 | 24 | 105.6 |
| 70 | 50 | 16 | do | 635 | 250 | 5 | 9.5 | 12.5 | 14 | 14 | 16 | 70.4 |
| 71 | 50 | None | 75 lbs. of Ca(OH)₂ | 632 | 275 | 3 | 4 | 5 | 6.1 | 6.2 | 9.8 | 43.1 |

[1] J polymer is 60% vinylpyrrolidone and 40% acrylamide copolymerized with 0.7% N,N-methylenebisacrylamide as a cross-linking agent.

Reference to Table VI shows that fluid loss from the ungelled composition is greatly lessened by the presence of the specific vinylpyrrolidone-acrylamide cross-linked with methylenebisacrylamide in the amounts shown.

EXAMPLE 7

It is sometimes desirable that the gelled composition be extruded as, for example, in treating formations comprising vugs and impacked fractures. In such instances, it is desirable that the plug resist up to about 100 pounds or more pressure but that it extrude into the vugs and fractures at relatively high pressures, thereby to serve as an excellent diverting agent for fracturing fluids but which subsequently disintegrates and no longer acts as a plug.

To show that the gelled composition can be extruded into larger openings, e.g. one-sixteenth to one-fourth inch in cross section to simulate vugs and large fractures, tests were performed as follows:

TABLE VII

| Test Number | Pounds of cellophane flake per 1,000 gallons of composition | Temp., °F. | Hydraulic pressure in p.s.i. | Extrusion through pipe having diameter of— | | |
|---|---|---|---|---|---|---|
| | | | | ⅜ inch | ¼ inch | ⅛ inch |
| 72 | None | 225 | 20 | Rapid | 1 inch in 10 sec | No movement. |
| 73 | None | 225 | 50 | | | Do. |
| 74 | None | 225 | 100 | | | 1 inch in 30 sec. |
| 75 | 25 | 225 | 20 | Rapid | 1 inch in 10 sec | No movement. |
| 76 | 25 | 225 | 100 | | | Do. |
| 77 | 25 | 225 | 200 | | | Held for 3 min. and then extruded rapidly. |
| 78 | 100 | 225 | 20 | Rapid | 1 inch in 15 sec | No movement. |
| 79 | 100 | 225 | 200 | | | Do. |
| 80 | 100 | 225 | 1,700 | | | Held for 2 min. and then extruded rapidly. |

A 12-inch long, 2-inch diameter pipe nipple was equipped with caps. The lower cap contained threaded ⅛-, ⅜- and ¼-inch diameter openings. The openings which were not being tested were plugged.

The gelable composition of the invention consisted essentially of borated guar gum, polyacrylamide (average weight between about 1,000,000 and 3,000,000) and water to make proportions of 500 pounds of the gum and 50 pounds of the polyacrylamide per 1,000 gallons of water.

The composition was poured into the 12-inch by 2-inch pipe and subjected to an advanced temperature for a period of 20 hours and at the pressure shown in the Table VII. Cellophane flake was added in the tests, as shown in the table, as a fluid loss additament.

Reference to Table VII shows that the gelled composition of the invention can be readily extruded into the larger opening and passageways as in an earthen formation being treated, e.g. fractured, where entrance of excessive amounts of the treating fluid into the larger openings is undesired, but will not so readily enter the smaller openings and passageways where entrance of the treating fluid is desired.

It can be seen that the composition of the invention offers the advantages of providing a temporary plug particularly adaptable for use in porous earthen formations, which is fluid when made, can be readily emplaced as needed, then gels to form a plug of temporary nature which is excellent for diverting subsequently injected fluids, and which at high pressures can be forced into relatively larger opening farther removed from the entrance, and thereafter disintegrates to a fluid which can be easily removed and does no formation damage.

What is claimed is:

1. A method for temporarily plugging a permeable formation which has an ambient temperature of at least about 150°F located adjacent to a well bore which penetrates a geologic formation which comprises: admixing from about an equivalent of 50 to about 2,200 pounds of the composition consisting essentially of, as parts by weight, a. from about 50 to about 1,500 parts of a particulate hydrophobically treated galactomannan gum so that when dispersed in an aqueous solution having a neutral to alkaline pH the gum does not readily hydrate in its normal length of time;

b. from about 3 to about 100 parts of a readily water-soluble organic polymeric suspending agent, the suspending action of which is not effected by the hydrophobing agent; and c. 0.03 to about 600 parts of a pH control agent in an amount which is effective to provide an initial pH in an aqueous solution in which the granulated composition is dispersed of at least about 7.5, with a sufficient quantity of an aqueous solution to make 1,000 gallons of a slurry and injecting the slurry into the permeable formation prior to any substantial hydration and cross-linking of the treated galactomannan gum occurs, and allowing the galactomannan gum to hydrate and cross-link while in said permeable formation.

2. A method for temporarily plugging a permeable formation located adjacent to a well bore located in a subterranean formation which comprises: injecting into said formation prior to any substantial hydration of the treated galactomannan gum a slurry composition which comprises:

a. from about 150 to about 1,500 pounds of a particulate galactomannan gum which has been treated with an effective amount of a hydrophobing agent so that the gum is less hydrophillic than normal when dispersed in an aqueous solution having about a neutral to alkaline pH value and has a normal hydrophillic characteristic in aqueous solution having an acidic pH value;

b. a water-soluble organic polymeric suspending agent, said water-solubility of said suspending agent not being effected by said hydrophobing agent and said agent producing about a neutral to alkaline pH value when dispersed in an aqueous solution from about 3 to about 100 pounds; and c. a sufficient amount of an aqueous solution to make 1,000 gallons of said slurry, said solution being buffered to have an initial pH of at least about 7.5.

* * * * *

UNITED STATES PATENT OFFICE
CERTIFICATE OF CORRECTION

Patent No. 3,763,934  Dated  October 9, 1973

Inventor(s) A. W. Coulter, Jr., D. L. Gibson & K. H. Nimerick

It is certified that error appears in the above-identified patent and that said Letters Patent are hereby corrected as shown below:

Column 2, line 5, delete "gun" and insert --gum--.

Column 5, line 66, delete "azobisisobutyro-nitrile" and insert --azobisisobutyronitrile--.

Column 9, Table I, 5th column, last item, delete "300" and insert --325--.

Column 13, line 31, delete "one-sixteenth" and insert --one-sixth--.

Signed and sealed this 23rd day of July 1974.

(SEAL)
Attest:

McCOY M. GIBSON, JR.
Attesting Officer

C. MARSHALL DANN
Commissioner of Patents